Nov. 26, 1963  J. O. SEMMELMAN ETAL  3,111,760
ARTICULATED TOOTH HOLDER
Filed Feb. 19, 1960  2 Sheets-Sheet 1
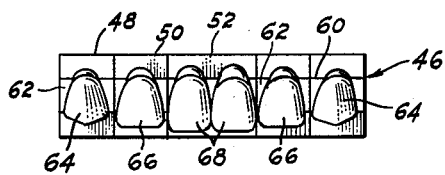
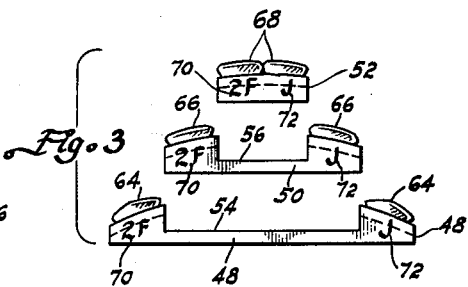
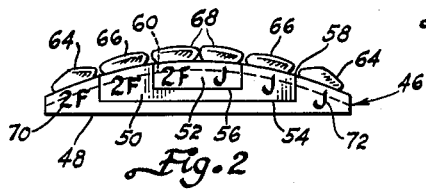
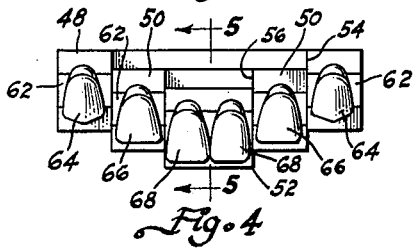
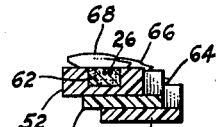
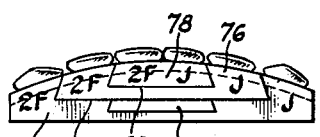
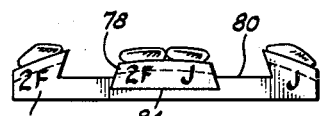
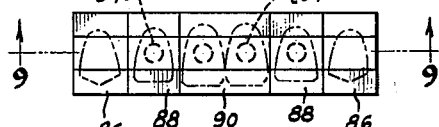
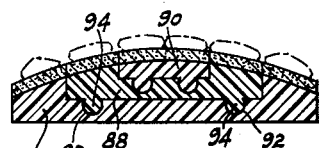
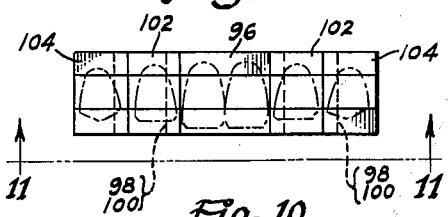
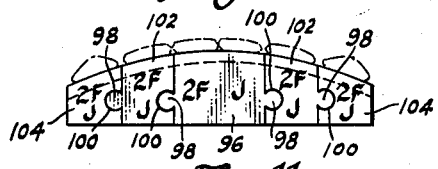
INVENTORS
JOHN O. SEMMELMAN
BY CARL E. SCHIDING
ATTORNEY Nov. 26, 1963　　J. O. SEMMELMAN ETAL　　3,111,760
ARTICULATED TOOTH HOLDER
Filed Feb. 19, 1960　　2 Sheets-Sheet 2
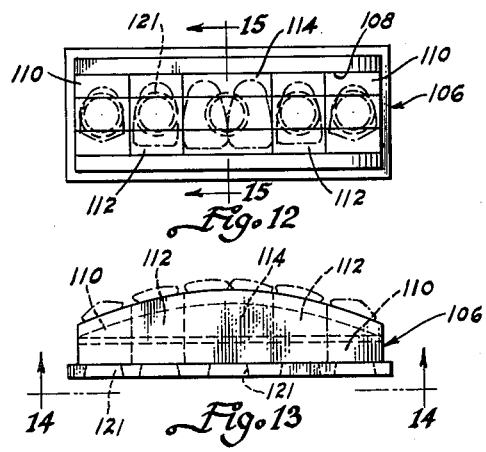
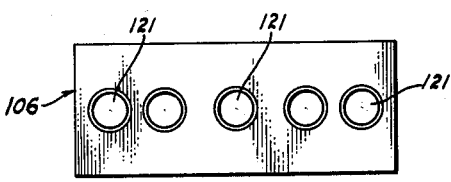
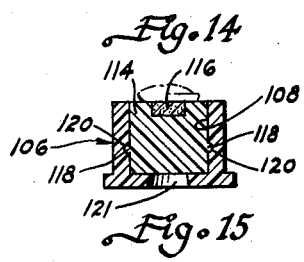
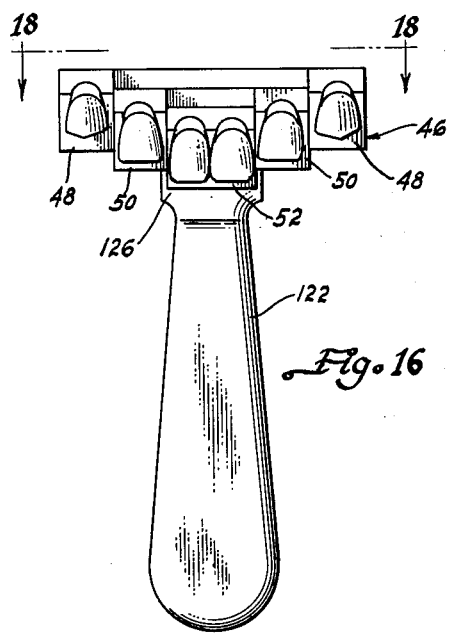
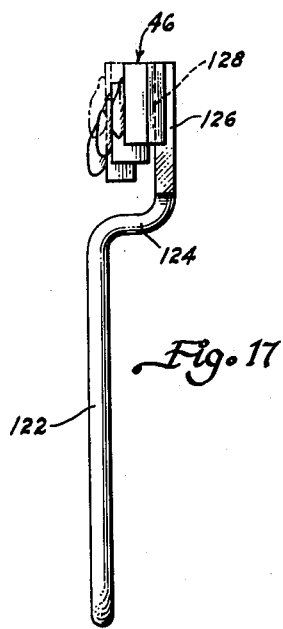
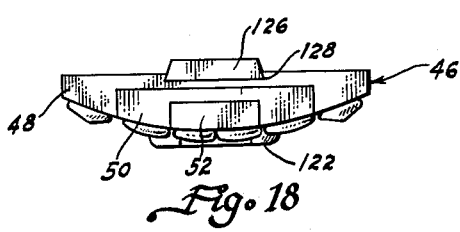
INVENTORS
JOHN O. SEMMELMAN
CARL E. SCHIDING
BY
ATTORNEY United States Patent Office 3,111,760
Patented Nov. 26, 1963

3,111,760
ARTICULATED TOOTH HOLDER
John O. Semmelman and Carl E. Schiding, York, Pa., assignors to The Dentists' Supply Company of New York, York, Pa., a corporation of New York
Filed Feb. 19, 1960, Ser. No. 9,896
8 Claims. (Cl. 32—71)

This invention relates to improvements in artificial tooth holders and, more particularly, to articulated artificial tooth holders designed and constructed to hold a set of related artificial teeth, preferably in the order in which they would occur in an intra-oral dental restoration, the holder further being designed to hold either anterior artificial teeth, posterior artificial teeth, or otherwise.

For many years past, it has been the custom, in connection with the manufacture, sale and handling of artificial teeth, to mount the same on an appropriate holder, usually referred to as a tooth card. In the use of such tooth cards, it has been quite common to provide tooth attaching means such as wax, either in a strip or panel, and, preferably, of a somewhat tacky nature, for purposes of securing artificial teeth removably to the tooth card. In regard to artificial teeth having pins affixed thereto, the pins are embedded in such wax means. In other situations, however, particularly in regard to the handling and sale of artificial teeth not provided with pins, said wax usually is sufficiently tacky to cause the artificial teeth to firmly adhere detachably thereto, simply by pressing the rear or lingual surfaces, for example, of the teeth into the wax.

Under the circumstances referred to above, relative to conventional tooth cards, it has been customary to mount artificial teeth in related sets, both with respect to related sizes of teeth and the same or closely harmonizing shades of teeth. When anterior artificial teeth are mounted on such a card, a related set thereof usually comprises six teeth, including both left and right canine teeth at opposite ends of the set, left and right lateral teeth inward from the canine teeth, and left and right central teeth in the center of the set of teeth. Usually, sets of upper anterior artificial teeth are mounted on one card, while corresponding sets of related lower anterior teeth are mounted on a different card, the cards also being provided with suitable identifying means, with respect to shade and size, to permit convenient handling of the teeth by factory personnel, dealers, and members of the dental profession, such as dentists and dental technicians.

Concerning the mounting of posterior artificial teeth, these, too, usually are mounted on tooth cards in related sets comprising both left hand and right hand first and second molars, and left hand and right hand first and second bicuspids, amounting to a total of eight teeth for each related set. As in regard to the anterior teeth referred to above, a set of lower posterior teeth usually are mounted on one tooth card and a set of upper posterior teeth are mounted on another card.

In the fabrication of complete dentures, the furnishing of related sets of the necessary artificial teeth is relatively easy, inasmuch as normal artificial dentures each require a set of six anterior teeth and a set of eight posterior teeth, in regard both to upper as well as lower dentures. Sometimes a limited amount of grinding of certain portions of certain teeth in the set may be necessary to completely adapt a normal set of artificial teeth of required size to a particular denture, for an individual patient. This procedure, however, is regarded as quite normal and, under most circumstances, complete sets of posterior and anterior teeth are ordered and used in the fabrication of a particular complete upper or lower denture, or in a complete set of both upper and lower dentures.

In accordance with modern dental aesthetics, however, either a patient or his dentist will sometimes order slightly mixed shades or sizes of certain individual teeth, for example, other than those normally furnished in a set of such teeth by the manufacturer, in order to prepare an individual denture for a particular patient. The teeth usually are sold through a dental distributor or at a dental depot from which the teeth are ordered either by the dentist or the dental technician fabricating the denture from a pattern prepared by the dentist.

Under the foregoing circumstances, it is necessary for the distributor or depot operator, in accordance with present methods and practice of merchandising artificial teeth, to supply complete sets of either anterior or posterior artificial teeth, or both, with respect to the different shades or sizes desired for an individual denture, whereby, for the preparation of even a single denture, it may be necessary to furnish possibly either two or three sets of anterior teeth, and several sets of posterior teeth, from which the dentist or laboratory technician will select only those teeth of each set he desires for the individual denture. The unused teeth in the sets from which the desired teeth have been removed for the denture are returned to the dental depot and, ultimately, to the tooth manufacturer, for credit.

When such partial set or sets of artificial teeth are returned to a manufacturer for credit, it is necessary for the manufacturer to remove the remaining teeth from the tooth card, clean and inspect them, especially to be sure that the teeth have not been tampered with in any way, such as by being ground or otherwise changed before being returned to the manufacturer, account for the teeth, secure the necessary teeth from stock to replace the missing teeth which have been used by the dentist or technician, and prepare a completely new set of teeth on a new tooth card, rather than merely discard those teeth which are returned for credit. To discard such teeth would be quite wasteful and expensive because considerable cost is present in such teeth, both with respect to labor as well as expensive materials.

The present arrangement for merchandising artificial teeth, as described above, particularly with respect to returning unused artificial teeth for credit, regardless of whether the teeth are in complete sets or only in partial sets, is a practice which has been followed for many years by most of the leading artificial tooth manufacturers. It is recognized as being an expensive procedure and adds materially to the overall cost of merchandising artificial teeth and to the ultimate cost of dentures. Nevertheless, there has been no apparent way of solving the problem of minimizing such additional cost heretofore, since prior efforts to improve the situation satisfactorily have not been forthcoming.

The principal object of the present invention is to provide a tooth holder for artificial teeth, particularly for a set of related artificial teeth, which holder is composed of separable parts or members which are articulated into a composite holder, a number of embodiments of such articulated holders being illustrated, described and claimed hereinafter. At least some of the articulated parts are provided with means to secure thereto, respectively, at least one tooth of a set of related teeth.

Another object of the invention is to provide an articulated tooth holder comprising a plurality of interfitting parts or members which respectively overlie each other and at least some of said parts or members have means thereon to hold, respectively, at least one tooth of a set of related artificial teeth, said parts or members respectively being movable transversely with respect to each other, within a plane parallel to the plane of artificial teeth held thereon, whereby the set of teeth supported by the assembled tooth holder may be arranged to present a more natural and life-like condition in accordance with a preferred tooth arrangement for a specific patient. The tooth holder thus may be utilized as a demonstration device to assist the dentist in showing a patient, quickly and in a preliminary manner, a general arrangement of the teeth as they will appear in a denture.

As a corollary to the immediately preceding object, it is still a further object to provide an appropriate handle means attachable to one or more of the parts or elements of the articulated tooth holder, whereby said tooth holder readily may be held relative to a patient's mouth for demonstrating purposes.

Still further objects of the invention are to provide various types of detachable connecting means between the tooth-holding parts or members of the articulated tooth holder, some of said means being snap-acting, whereby, generally, the present invention provides an artificial tooth holder upon which a set of related artificial teeth, for example, may have certain teeth of said set, either singly or in combination with other teeth of a set, mounted upon the various articulated parts or members. Accordingly, when it is desired to furnish only a number of teeth of a specific set thereof less than the entire set to a dentist or laboratory customer, such individual teeth or a limited number of said set less than the entire set may be furnished upon tooth-holding means or members separable from others and prepared by the manufacturer and supplied to the distributor or depot in such form of tooth holder. Hence, upon removing a set of teeth less than the complete set from the articulated tooth holder, those teeth which are removed from one of the articulated tooth-holding parts or members may be replaced by others prepared at the factory of the manufacturer and mounted upon articulatable parts of a tooth holder, whereby the costly, current practice of returning partial sets of teeth to a manufacturer for credit may be greatly minimized or substantially eliminated, and the overall cost of merchandising artificial teeth thus will be materially reduced.

It is still another object of the invention to provide an articulated tooth holder which is attractive in appearance, strong enough to protect the artificial teeth held thereby, light enough to be handled easily, inexpensive to manufacture, and convenient to use and ship.

Details of the foregoing objects and of the invention, as well as other objects thereof, are set forth in the following specification and illustrated in the accompanying drawings comprising a part thereof.

In the drawings:

FIG. 1 is a top plan view of one embodiment of articulated tooth holder incorporating the principles of the invention.

FIG. 2 is a side elevation of the tooth holder shown in FIG. 1.

FIG. 3 is a side elevation of a vertically exploded view of the various parts of the tooth holder shown in FIGS. 1 and 2.

FIG. 4 is a top plan view of the tooth holder shown in FIGS. 1 through 3 with the various parts moved a limited distance transversely within the normal planes of the parts, so as to present a curved arrangement of the artificial teeth attached to the various parts.

FIG. 5 is a vertical sectional view taken on the line 5—5 of FIG. 4.

FIG. 6 is a side elevation of another embodiment of tooth holder which incorporates the principles of the present invention and, in some respects, resembles the embodiment of tooth holder shown in FIGS. 1 through 5, as described hereinafter in the specification.

FIG. 7 is a side elevation of a modified arrangement of the embodiment of tooth holder shown in FIG. 6 and illustrating the manner in which the uppermost and lowermost tooth-holding members of the assembly may be detachably connected.

FIG. 8 is a top plan view of still another embodiment of tooth holder.

FIG. 9 is a longitudinal vertical sectional view of the embodiment of tooth holder shown in FIG. 8, taken on the line 9—9 of FIG. 8.

FIG. 10 is a top plan view of still another embodiment of tooth holder, utilizing principles of the invention.

FIG. 11 is a side elevation of the embodiment shown in FIG. 10, as seen from the line 11—11 of FIG. 10.

FIG. 12 is a top plan view of a further embodiment of tooth holder, utilizing the present invention.

FIG. 13 is a side elevation of the embodiment shown in FIG. 12.

FIG. 14 is a bottom plan view of the embodiment shown in FIGS. 12 and 13.

FIG. 15 is a vertical sectional elevation taken on the line 15—15 of FIG. 12.

FIG. 16 is a front elevation of the embodiment of the invention, as shown in FIGS. 1 through 5, to illustrate an exemplary manner of attaching a display handle to the tooth holder for purposes of using the latter as a selection rim, one exemplary manner of attaching the handle to one tooth-holding member of the articulated assembly being shown.

FIG. 17 is a side elevation of the embodiment shown in FIG. 16.

FIG. 18 is a top end view of the embodiment shown in FIG. 16, as seen on the line 18—18 of said figure.

The present invention comprises a plurality of various embodiments of articulated artificial tooth holders which, in general, include similar essential basic principles, and are employed preferably to hold a set of related artificial teeth in the successive order in which they normally occur in a denture, or in the order in which corresponding human teeth occur in a human mouth. The individual teeth of a set of predetermined number, such as six anterior teeth, for example, are illustrated in exemplary manner in the various embodiments illustrated in the drawings. Referring first to the example of the embodiment illustrated in FIGS. 1 through 5, it will be seen that the articulated holder 46, especially as shown in FIGS. 2 and 3, comprises a plurality of respectively complementary tooth-holding members 48, 50 and 52, which overlie each other in laminated form. It will readily be seen, from FIGS. 1 and 2, that the member 48 has a recess 54 which is complementary to and receives the member 50, and member 50 has a recess 56 which is complementary to and receives member 52.

The upper surface of the articulated and laminated tooth-holding members comprises a preferably continuous curve 58 which somewhat resembles the normal curvature of the human gum, whereby successive teeth of an exemplary set of predetermined number of anterior teeth, for example, appear more life-like when disposed on such a tooth holder, as illustrated in this embodiment.

Each of the upper surfaces of the end portions of the members 48 and 50, as well as the upper surface of the entire member 52, are provided with a continuous channel 60, which receives tooth securing means, such as strips of wax 62. The members 48, 50 and 52 may be formed from any suitable material but, in the preferred embodiment, are molded from synthetic resin and the recesses 54 and 56, respectively formed in members 48 and 50, are closely complementary to the members they receive, whereby all of the members may be retained in assembled relationship readily by friction. Further, the ends of the wax strips 62, in the various members, will operate to engage each other and, due primarily to the tacky nature thereof, will adhere separately to each other and thereby aid in retaining the various nested and overlying members separably connected to each other, so as to prevent, especially, accidental separation of the members from the other members to which they are connected.

In the embodiment of the invention illustrated in FIGS. 1 through 5, the opposite ends of the tooth-holding member 48 hold, respectively, the left and right hand canine teeth 64 and a set of anterior, or front, teeth, for example; the opposite ends of member 50 respectively hold the left and right hand lateral teeth 66 of a set of anterior teeth; and the member 52 holds the left and right central teeth 68 of such set of anterior teeth.

For purposes of ready identification, suitable indicia, of the type customarily employed to identify mold numbers which identify shape, and the shade numbers which identify the color of the teeth, are employed in the articulated tooth holders comprising the present invention.

For example, in the embodiment shown in FIGS. 1 through 5, a convenient place to include such mold and shade identifying indicia will be the corresponding side surfaces of the members 48, 50 and 52, as best shown in FIGS. 1 and 2, wherein indicia 70 and 72 may be used respectively to identify the mold number of the teeth and the shade thereof. Obviously, it is to be understood that these specific indicia are merely illustrative and not restrictive. Where possible, it is also convenient to place such indicia on the wax securing means to which the teeth are affixed on the various tooth-holding members.

The embodiment of the invention illustrated in FIGS. 1 through 5 also presents an additional advantage in that the member 52, for example, may be moved laterally, within the plane of the said member, relative to the member 50, and the member 50 likewise may be moved laterally within the plane thereof, relative to the member 48, so as to provide an exemplary illustrative arrangement, as shown in FIG. 4, wherein such arrangement may, possibly, be more life-like for an individual patient than a straight line of said teeth, as shown in FIG. 1, for example. Hence, this type of articulated tooth holder can be used to serve somewhat as a selection rim. Actually, the illustration in FIGS. 4 and 5 is somewhat exaggerated, so as better to illustrate this possibility of the invention. In a life-like situation, it is possible that the various tooth-holding members will not be moved much more than 1/16 of an inch, relative to each other but, nevertheless, the result will be a curved configuration of the set of teeth which will, in some circumstances, be more life-like for an individual patient, as mentioned above.

The adjusted positions of the tooth-holding members, relative to each other, as shown in FIGS. 4 and 5, will be maintained tentatively and temporarily, due to the frictional interfitting of the holding members relative to each other. Such an arrangement readily can be held to the face of a patient, even possibly somewhat in back of the lip, when the mouth is open, so as to afford a demonstrating means for a dentist to use with a patient.

The further embodiment of the invention, illustrated in FIGS. 6 and 7, somewhat resembles that shown in FIGS. 1 through 5, except that the various overlying and interfitting tooth-holding members 74, 76 and 78, rather than having parallel ends, are provided with sloping ends which are complementary to dovetailed-type recesses 80 and 82, respectively formed in members 74 and 76, it being understood that said tooth-holding members are formed with precise dimensions so as to afford frictional engagement between the members and the dovetailed-type recesses which receive such members. Additionally, the member 74 also is formed with an auxiliary dovetailed shaped recess 84 which is similar in size to recess 82 in member 76, the recess 84 being for purposes of receiving the member 78, as when the pair of lateral teeth mounted upon member 76 are sold, while the teeth on members 74 and 78 are retained by the distributor, for example, or vice versa. Under such circumstances, since the teeth upon members 78 and 74 belong to a common set thereof, they will not become disengaged from each other when the members 74 and 78 are connected, as illustrated in FIG. 7. Otherwise, the attributes and advantages of the embodiment shown in FIGS. 6 and 7 are the same as those of the embodiment of FIGS. 1 through 5.

Still another embodiment is illustrated in FIGS. 8 and 9, which, although otherwise similar to the embodiment of FIGS. 1 through 5, is provided with more positive attaching means between the various tooth-holding members than is utilized in the embodiment of FIGS. 1 through 5. For example, the longest tooth-holding member 86 of this embodiment has a recess to receive the intermediate tooth-holding member 88, the latter also having a recess to receive the upper and innermost tooth-holding member 90. The various members, however, are provided with interfitting recesses 92 and projections 94. In the preferred structure of this embodiment, said interfitting is snap-type, the recesses 92 being complementary to the rounded bead-like members 94, so as to be readily releasable therefrom. Such connecting means are feasible and effective, particularly when the resin employed to form the various tooth-holding members 86, 88 and 90 is readily pliable and flexible, such as certain types of polyethylene. Otherwise, the tooth-holding means, preferred tooth arrangement, and identifying indicia employed in this embodiment are similar to those of the preceding embodiments on the same sheet of the drawings.

A still further embodiment is illustrated in FIGS. 10 and 11, wherein it will be seen that a central tooth-holding member 96, preferably molded from synthetic resin but which may be molded from any other suitable material, holds a pair of central artificial teeth, for example, and is provided at opposite sides with elongated connecting members 98. These connecting members are complementary to and are received within elongated recesses 100 respectively formed in separate, intermediate tooth-holding members 102. The latter members, for example, hold the lateral teeth of a set of artificial anterior teeth. Said intermediate tooth-holding members are provided with elongated connecting members 98 and the end or outermost tooth-holding members 104 are provided with complementary elongated recesses 100 to receive the latter connecting members 98 of the intermediate tooth-holding members.

In this embodiment of the invention, if the various tooth-holding members or parts, and particularly the intermediate and outermost members 102 and 104 are formed from pliable synthetic resin, such as certain types of polyethylene, said outermost members may be snapped separably apart from each other and from the central member 96 by pulling the same in the direction of the longitudinal axis of the assembled, articulated tooth holder. However, it is conceivable that the various tooth-holding members can be formed from relatively rigid synthetic resin, or other suitable material, even including metal, if desired, and the various members can be disconnected from each other by moving the same in opposite directions along the axes of the elongated members 98. As to the tooth-holding means and identifying indicia, however, this embodiment is similar to the other embodiments illustrated on the same sheet of the drawings.

One further embodiment of the invention is illustrated in FIGS. 12 through 15 which, in some respects, employs basic principles similar to those included in the preceding embodiments. In the former, and by referring to FIGS. 12 through 15, it will be seen that a channel-shaped base member 106, which preferably is molded from somewhat pliable or elastic resin, such as polyethylene, is provided with a central channel 108. Said base member holds in longitudinal arrangement, within said channel 108, a plurality of tooth-holding members comprising endmost members 110, to which, for example, canine teeth respectively are connected; intermediate members 112, to which lateral artificial teeth are connected; and a central tooth-holding member 114, to which a pair of left and right central artificial teeth are connected. These tooth-holding members are provided with a continuous channel in which separated wax strips 116 are disposed to comprise tooth-connecting means similar to the wax means of the preceding embodiment and thus illustrated in FIG. 15. The tooth-holding members 110, 112 and 114 may be formed such as by molding from any suitable synthetic resin or other suitable material. Preferably, said members are provided with projecting ribs 118 on opposite sides thereof which, respectively, are received in appropriate channels 120 formed on the inner surfaces of the channel-forming walls of base member 106, this arrangement comprising detachable connecting means.

Assuming that the base member 106 is formed from pliable resin, such as polyethylene, it is possible to snap the various tooth-holding members out from the top of the channel and, to facilitate such operation, the bottom panel of the base member 106 is provided with a plurality of push-out or punch-out holes 122, into which the end of a pencil or some other suitable instrument may be inserted to effect the removal of the desired tooth-holding member, for purposes similar to those described above relative to the preceding embodiments, in regard to effecting savings in the maintenance and arrangement of stocks of artificial teeth by distributors and at dental depots.

It will be understood that the various embodiments shown in FIGS. 12 through 15, as well as all of those illustrated in Sheet 1 of the drawings of the application, although showing exemplary arrangements of a set of anterior artificial teeth, are not to be regarded as restricting the invention to the use of the various embodiments of tooth holders for the holding and display of anterior teeth only, inasmuch as posterior and other types of teeth may be mounted upon suitable articulated tooth holders embodying the same principles as those illustrated in these figures.

To adapt the principles of the invention to the holding and displaying of sets of anterior teeth, it may be preferable to possibly provide as many as four individual tooth-holding members, respectively to hold, for example, the left and right first bicuspids; the left and right second bicuspids; the left and right first molars, and the left and right second molars. Such arrangement is not to be considered restrictive, however, since other methods of dividing sets of posterior or rear teeth may be devised and utilized, in lieu of the foregoing suggested arrangement, all within the spirit and scope of the present invention.

Further, the various embodiments illustrated on Sheet 1 of the drawings and FIGS. 12 through 15 are intended principally to show various methods of connecting the individual tooth-holding members to each other and/or to a base member, it being understood that other holding and connecting arrangements are conceivable within the spirit and principles of the present invention exemplified by those embodiments which are specifically illustrated.

To further facilitate the use of a tooth holder embodying the principles of the present invention, for purposes of serving as a selection rim, for example, attention is directed to FIGS. 16 through 18, wherein the exemplary tooth holder 46, which is illustrated in detail in FIGS. 1 through 5, has been selected for illustration in conjunction with a handle 122 which, preferably, has an offset 124 and a connecting portion 126 which, for purposes of illustration only, is illustrated as comprising a dovetailed figuration, best illustrated in FIG. 18. Said dovetailed connecting portion 126 is received within a shallow dovetailed recess 128, which is complementary to the shape of the portion 126 of the handle 122. If desired, opposite sides of the portion 126 may be tapered, rather than parallel, so as to effect further wedging action of the portion 126 when connecting the articulated tooth holder 116 thereto. It is to be understood, also, that the specifically illustrated handle is merely one of a number of suitable handles which can be designed and employed within the spirit of the invention. For example, the handle may be applied to one or the other ends of the tooth holder 116, either at the rear surface thereof or otherwise, as desired.

By employing a handle 122, such as illustrated in the exemplary manner only, it will be seen that the various teeth of the exemplary set of teeth may be arranged in more life-like condition by sliding the various tooth-holding members relative to each other, such as described in detail above and relative to FIGS. 4 and 5. When the set of teeth carried by the tooth-holding member 46 is mounted upon the handle 122, it may conveniently be held either within or adjacent the oral cavity of a patient for demonstration purposes similar to those for which a selection rim normally is employed.

In view of the foregoing, it will be seen that the present invention provides various embodiments of articulated tooth holders upon the various tooth-holding elements of which individual, pairs, or other groups of artificial teeth, may respectively be mounted and held for display purposes, or otherwise, for the same reasons as conventional unitary tooth cards now are employed. However, by arranging articulated tooth-holding members, which are separably connectable to each other or to a supporting base member, of suitable construction, of which a number of embodiments are illustrated herein, it will be seen that considerable savings can be effected in the sale and general merchandising systems now employed in relation to artificial teeth, as compared with current practices in which unitary tooth cards, respectively holding an entire set of teeth, are employed. Such savings result principally from minimizing the need to return partial sets of teeth which remain in the hands of the distributor or operator of a dental depot, after only an individual tooth or a very limited number of artificial teeth, less than an entire set thereof, are desired by a customer.

While the invention has been described and illustrated in its several preferred embodiments, it should be understood that the invention is not to be limited to the precise details herein illustrated and described, since the same may be carried out in other ways falling within the scope of the invention as claimed.

We claim:

1. An artificial tooth holder having a substantially continuous upper surface extending between the ends thereof to hold a set of a predetermined number of related artificial teeth and comprising a plurality of closely articulated parts, connecting means on said parts quickly and detachably separable to connect said parts detachably to each other, and tooth securing means on said parts operable to secure detachably to each of said parts at least one artificial tooth of said set thereto and said parts being arranged to hold all of the teeth of said set in closely arranged order simulating the appearance of said teeth when arranged in an intra-oral restoration.

2. An articulated holder for artificial teeth comprising a plurality of parts connected separably in a predetermined arrangement having a substantially continuously curved upper surface extending between the ends of said holder to hold a set of related artificial teeth of a predetermined number upon said surface, interfitting and readily coengageable and separable means on said parts operable to connect said parts readily and detachably to each other to form said articulated holder having said continuously curved upper surface, and tooth securing means on said parts respectively operable to secure detachably to the portion of said curved upper surface thereon at least one artificial tooth of a set of a predetermined number of related artificial teeth.

3. The holder set forth in claim 2 further characterized by said holder being elongated and said parts being separated from each other transversely to the longitudinal axis of said holder, and said tooth securing means comprising pliable wax held firmly by said parts to which teeth are to be secured, said wax being in an elongated arrangement upon said parts of said holder to hold said teeth closely adjacent each other upon said parts in the order in which they would occur in an intra-oral restoration if all of said set of teeth were fabricated therein, said wax being severed transversely coincident with the transverse separation of said parts relative to each other.

4. The holder for artificial teeth set forth in claim 1 further characterized by said articulated parts having channel means extending longitudinally thereof substantially in continuous longitudinal alignment between the ends of said holder, and elongated tacky wax means in said channel means operable to secure atrificial teeth detachably thereto, the wax means respectively in said parts being adheringly engageable with the wax means in adjacent parts, thereby comprising means connecting said parts detachably to each other.

5. A holder for artificial teeth comprising a plurality of articulated parts positioned substantially in end to end longitudinal alignment with each other, and readily releasable interengaging connecting means on adjacent ends of said parts separably connecting said parts together in said longitudinal alignment, said parts also having means thereon operable to secure releasably to each of the same at least one artificial tooth of a set of related artificial teeth of a predetermined number.

6. An elongated articulated holder having a smooth substantially continuous upper surface to receive a set of related artificial teeth, said holder comprising a plurality of parts arranged to at least partially overlie each other within substantially parallel planes, connecting means on said parts operable to connect said parts readily and separably together and constructed to permit separation by relative movement between said parts in a direction parallel to the planes thereof and also in directions transverse to the longitudinal axis of the holder, and tooth securing means on the portions of at least some of said parts which comprise said continuous upper surface of said tooth holder and said means being operable to secure detachably to said upper surfaces of each of said parts at least one tooth of a set of related artificial teeth of a predetermined number.

7. An elongated articulated holder having a smooth substantially continuous upper surface to receive a set of related artificial teeth, said holder comprising a plurality of parts arranged to at least partially overlie each other flatwise within planes substantially parallel to each other, connecting means on said parts operable to connect said parts readily and separably together and constructed to permit separation by relative movement in directions substantially perpendicular to each other and transverse to the longitudinal axis of the holder, and tooth securing means on the portions of at least some of said parts which comprise said continuous upper surface of said tooth holder and said means being operable to secure detachably to said upper surfaces of each of said parts at least one tooth of a set of related artificial teeth of a predetermined number.

8. The elongated holder for a set of artificial teeth set forth in claim 6 further characterized by said connecting means on said parts being operable to effect an arched arrangement of said teeth of said set substantially within the plane of the upper surface of said holder, whereby said holder may serve as a demonstrating device for said set of teeth.

References Cited in the file of this patent
UNITED STATES PATENTS

| | | |
|---|---|---|
| 1,655,183 | Gibson | Jan. 3, 1928 |
| 2,262,641 | Hayward | Nov. 11, 1941 |
| 2,805,478 | Adams | Sept. 10, 1957 |